US011847597B2

(12) United States Patent
Mayrhofer

(10) Patent No.: US 11,847,597 B2
(45) Date of Patent: Dec. 19, 2023

(54) COMPUTER NETWORK WITH A PERFORMANCE ENGINEERING MATURITY MODEL SYSTEM

(71) Applicant: PERFORMETRIKS LLC, Minnetonka, MN (US)

(72) Inventor: Josef Mayrhofer, Minnetonka, MN (US)

(*) Notice: Subject to any disclaimer, the term of this patent is extended or adjusted under 35 U.S.C. 154(b) by 0 days.

(21) Appl. No.: 17/515,606

(22) Filed: Nov. 1, 2021

(65) Prior Publication Data

US 2022/0172141 A1 Jun. 2, 2022

Related U.S. Application Data

(60) Provisional application No. 63/118,948, filed on Nov. 29, 2020.

(51) Int. Cl.
*G06Q 10/0631* (2023.01)
*G06Q 10/0639* (2023.01)
*G06N 5/04* (2023.01)
*G06Q 10/0637* (2023.01)

(52) U.S. Cl.
CPC ......... *G06Q 10/06315* (2013.01); *G06N 5/04* (2013.01); *G06Q 10/06375* (2013.01); *G06Q 10/06393* (2013.01)

(58) Field of Classification Search
CPC ....... G06Q 10/06315; G06Q 10/06375; G06Q 10/06393; G06N 5/04
USPC ...................................................... 705/7.25
See application file for complete search history.

(56) References Cited

U.S. PATENT DOCUMENTS

| 7,698,686 | B2 | 4/2010 | Carroll et al. |
| 7,739,099 | B2* | 6/2010 | Liu ........................ G06Q 10/06 703/2 |
| 9,959,412 | B2* | 5/2018 | Strauss .................. G06N 20/00 |
| 11,431,740 | B2* | 8/2022 | Heckman ................ H04L 63/20 |
| 2014/0282586 | A1* | 9/2014 | Shear ........................ G06F 9/50 718/104 |
| 2015/0106151 | A1* | 4/2015 | Krishnaswamy ........................... G06Q 10/06315 705/7.25 |
| 2018/0060398 | A1* | 3/2018 | Johnson .............. G06F 16/2462 |
| 2020/0293970 | A1* | 9/2020 | Hwang .............. G06Q 10/0635 |
| 2021/0035116 | A1* | 2/2021 | Berrington ................ G06F 9/54 |
| 2021/0334821 | A1* | 10/2021 | Berrington ............... G06N 5/04 |

OTHER PUBLICATIONS

Richard M. Adler "A Dynamic Capability Maturity Model for Improving Cyber Security" 978-1-4799-1535-4/13/$31.00 © 2013 IEEE. (Year: 2013).*
https://www.performetriks.com/blog/search/maturity.
https://performetriks.info/#products.
Schmietendorf et al., "Evaluating the Performance Engineering Process", WOSP '00: Proceedings of the 2nd international workshop on Software and performance, Sep. 2000, pp. 89-95.

* cited by examiner

*Primary Examiner* — Abdallah A El-Hage Hassan
(74) *Attorney, Agent, or Firm* — Edlavitch Law PLLC

(57) ABSTRACT

Described herein is a performance engineering maturity model (PEMM) system that can be implemented in a computer network to improve upon or overcome performance engineering issues within information technology (IT) systems of organizations.

20 Claims, 7 Drawing Sheets

COMPUTER NETWORK WITH A PERFORMANCE ENGINEERING MATURITY MODEL SYSTEM

CROSS-REFERENCE TO RELATED APPLICATIONS

The present application claims the benefit of priority from U.S. Provisional Patent Application No. 63/118,948, filed on Nov. 29, 2020, and entitled "SYSTEM FOR EVALUATING THE PERFORMANCE MATURITY OF AN ORGANIZATION AND METHOD THEREOF", the entire disclosure of which application is hereby incorporated herein by reference.

TECHNICAL FIELD

The present disclosure relates to computer networks with a performance engineering maturity model (PEMM) system.

BACKGROUND

Industries are becoming more automated and dependent on information technologies every day. On one hand, tasks of organizations and end users are becoming easier to perform and manage through automation, and on the other hand, such entities are facing enormous challenges regarding performance of their automation and information technologies. Achieving a high level of effectiveness and efficiency in information technology (IT) systems without interruption can be hard to achieve, and interruption of IT systems is costly to an organization.

To improve upon the efficiency and effectiveness of IT systems within an organization, it needs to have standard methods, processes, and tools to build and manage reliable IT systems. There are several methods and tools available to enhance the performance of systems. Some of these tools may evaluate the maturity of a system.

Maturity is a measurement of the ability of an organization for continuous improvement in a particular discipline, such as IT systems of an organization. The higher the maturity, the higher the chances that incidents or errors will lead to improvements either in the quality or in the use of the resources of IT systems by the organization. Most maturity models assess qualitatively processes, structures, technology, and people and culture within a system.

One example type of maturity model used to analyze, improve, and manage IT systems is a performance engineering maturity model (PEMM). A PEMM is a model that can be used by organizations to evaluate the performance engineering maturity. It is a model for process improvement in the area of performance engineering. The use of PEMM allows the evaluation of the level of integration and application of performance engineering. PEMM can use aspects of a capability maturity model (CMM)—which is used for software engineering. PEMM can be based on questionnaires and the results of evaluation of the questionnaires.

As of yet, a PEMM system has not been effectively implemented in a computer network to improve upon or overcome performance engineering issues within IT systems of organizations.

SUMMARY

Described herein are systems and methods for overcoming technical problems associated with implementing a PEMM system. For example, described herein are systems and methods leveraging computer networking and software architecture to overcome technical problems associated with implementing a PEMM system. As of yet, a PEMM system has not been effectively implemented in a computer network to improve upon or overcome performance engineering issues within IT systems of organizations. Disclosed herein is a PEMM system that can be effectively implemented in a computer network to improve upon or overcome performance engineering issues within such IT systems.

The PEMM system can execute a method for evaluating the performance engineering maturity of an organization. Also, embodiments of the PEMM system can provide a way to understand standards, processes and tools used by the organization to build fast and reliable IT solutions. The PEMM system can also be used to analyze the performance engineering maturity of an organization by obtaining ranks or ratings for the organization based on its performance maturity and comparing it with a corresponding industry benchmark rank to understand IT areas within an organization to improve.

In some embodiments, the PEMM system evaluates the performance engineering maturity of an organization to understand standards, processes and tools used by the organization to build fast and reliable solutions, and the system includes an input module handled by a system administrator for inputting information about the organization. The system can also include a database that includes a questionnaire database that stores plurality of predefined sets of questions that are shared with the system administrator over the input module, and the system can include a rank database that stores standard pre-defined ranks for pre-determined functional areas, which indicates a suggested ranking for the organization to perform at an enhanced performance level. The system also can include an interaction module that accesses an application of the organization, identifies one or more meta-data associated with the organization, receives inputs of the system administrator from the input module, shares the inputs with the questionnaire module and shares questions with the system administrator over input module based on the responses received by the system administrator and the information gathered from the application. The system can also include a ranking module that generates rankings for the organization based on the meta-data received from the application and the responses received by the interaction module for questions asked, which are accessed from the questionnaire database. The system can also include a comparator that receives the meta-data and the rank of the organization from the ranking module and standard rank from the ranking database that is required for the organization to work at an enhanced performance level in a functional area of the organization to identify one or more zones where performance of the organization needs to be enhanced. The system also includes a solution identifier module that generates a report to share with the system administrator over the input module. The report is based on the received meta-data of the organization and one or more details from the comparator that includes one or more zones where performance of the organization can be enhanced and thereby achieve a higher performance maturity level.

In some embodiments, the database includes a questionnaire database and a ranking database that can be accessed over Internet and can be provided by at least one of server and cloud computer network. In some embodiments, the application of the organization accessed to obtain the meta-data can be at least one of a web page, website, mobile application and the like. In some embodiments, the metadata obtained by accessing the application can include metadata associated with aspect of an IT system of an organization.

In summary, the systems and methods (or techniques) disclosed herein can provide specific technical solutions to at least overcome the technical problems mentioned in the background section and other parts of the application as well as other technical problems not described herein but recognized by those skilled in the art.

With respect to some embodiments, disclosed herein are computerized methods for implementing a PEMM system in a computer network, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method of a PEMM system in a computer network.

With respect to some embodiments, a system is provided that includes at least one computing device configured to provide a PEMM system in a computer network. And, with respect to some embodiments, a method is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

These and other important aspects of the invention are described more fully in the detailed description below. The invention is not limited to the particular assemblies, apparatuses, methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure. It is to be understood that the accompanying drawings presented are intended for the purpose of illustration and not intended to restrict the disclosure.

DETAILED DESCRIPTION

Described herein are systems and methods for overcoming technical problems associated with implementing a PEMM system. For example, described herein are systems and methods leveraging computer networking and software architecture to overcome technical problems associated with implementing a PEMM system. Also, described herein are systems for evaluating the performance engineering maturity of an organization and methods thereof. As of yet, a PEMM system has not been effectively implemented in a computer network to improve upon or overcome performance engineering issues within IT systems of organizations.

Figure 1:
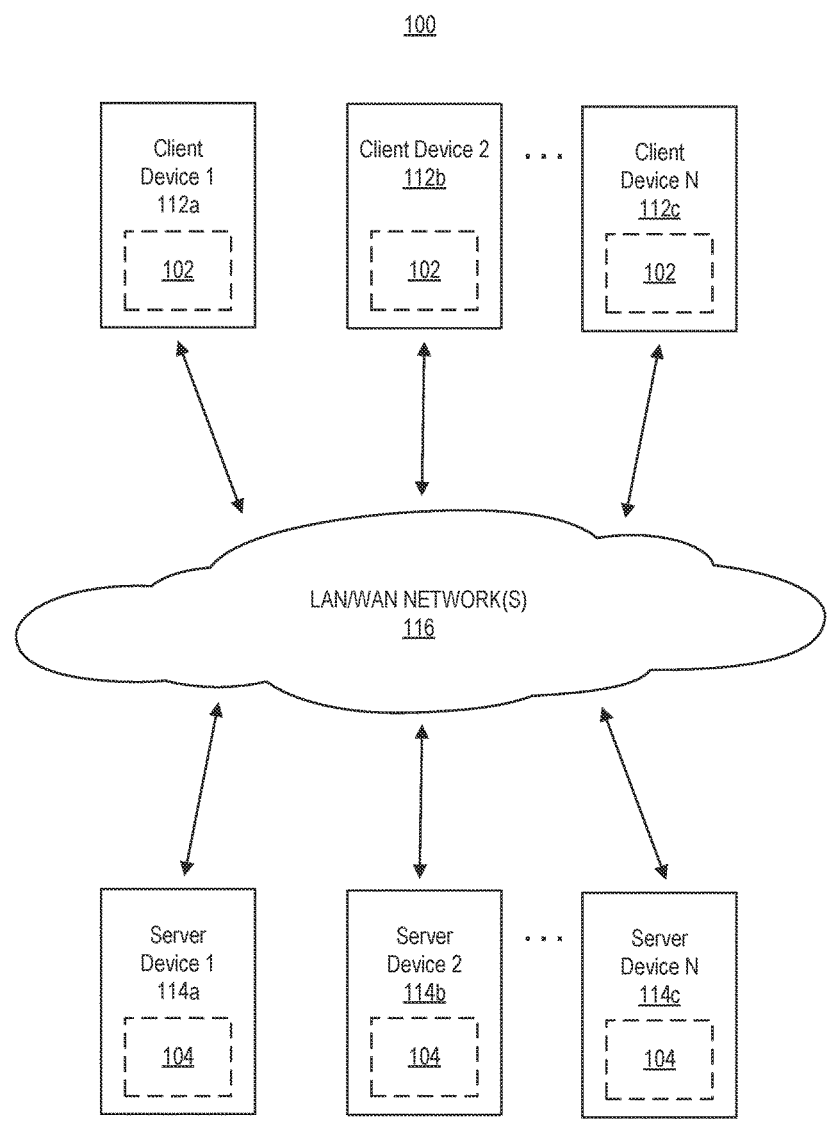
FIG. 1 illustrates an example computer network of computer systems to implement technologies for a PEMM system, in accordance with some embodiments of the present disclosure.

FIG. 1 illustrates an example computer network 100 of computer systems to implement technologies for a PEMM system that includes a system frontend 102 and a system backend 104, in accordance with some embodiments of the present disclosure. The computer network 100 can implement any of the operations, modules, engines, or other types of components of the systems described herein. In some embodiments, such as the embodiments shown in the figures, the PEMM system is unique because it provides a solution to expensive performance problems. The PEMM system simplifies and standardizes performance engineering in the software development stream as well makes investments in performance engineering measurable. The PEMM system removes much of the trial and error in developing and managing IT systems. Some parts of the PEMM system are somewhat analogous to a rating system that rates financial products. Additionally, such parts of the system can create transparency and guide organizations to their target performance engineering state by using a software-based rating module and providing a meaningful remediation plan via a solution identifier module (e.g., see the solution identifier module shown in FIGS. 2 and 3 as well as the recommendation engine 612 shown in FIG. 6).

The computer network 100 is shown including client devices (e.g., see client devices 112a, 112b, and 112c). As shown, the system frontend 102 of the PEMM system can be hosted and executed on the client devices of the computer network 100. The computer network 100 is also shown including server devices (e.g., see server devices 114a, 114b, and 114c). As shown, the system backend 104 of the PEMM system can be hosted and executed on the server devices of the computer network 100. Also, the computer network 100 is shown including one or more LAN/WAN networks 116 which is shown communicatively coupling the server devices hosting the system backend 104 and the client devices hosting the system frontend 102. The LAN/WAN network(s) 116 can include one or more local area networks (LAN(s)) and/or one or more wide area networks (WAN(s)). The LAN/WAN network(s) 116 can include the Internet and/or any other type of interconnected communications network. The LAN/WAN network(s) 116 can also include a single computer network or a telecommunications network. More specifically, the LAN/WAN network(s) 116 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the computer network 100 can be or include a computer system which can include memory that can include media. The media can include or be volatile memory components, non-volatile memory components, or a combination of such. In general, each of the computer systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

Figure 2:
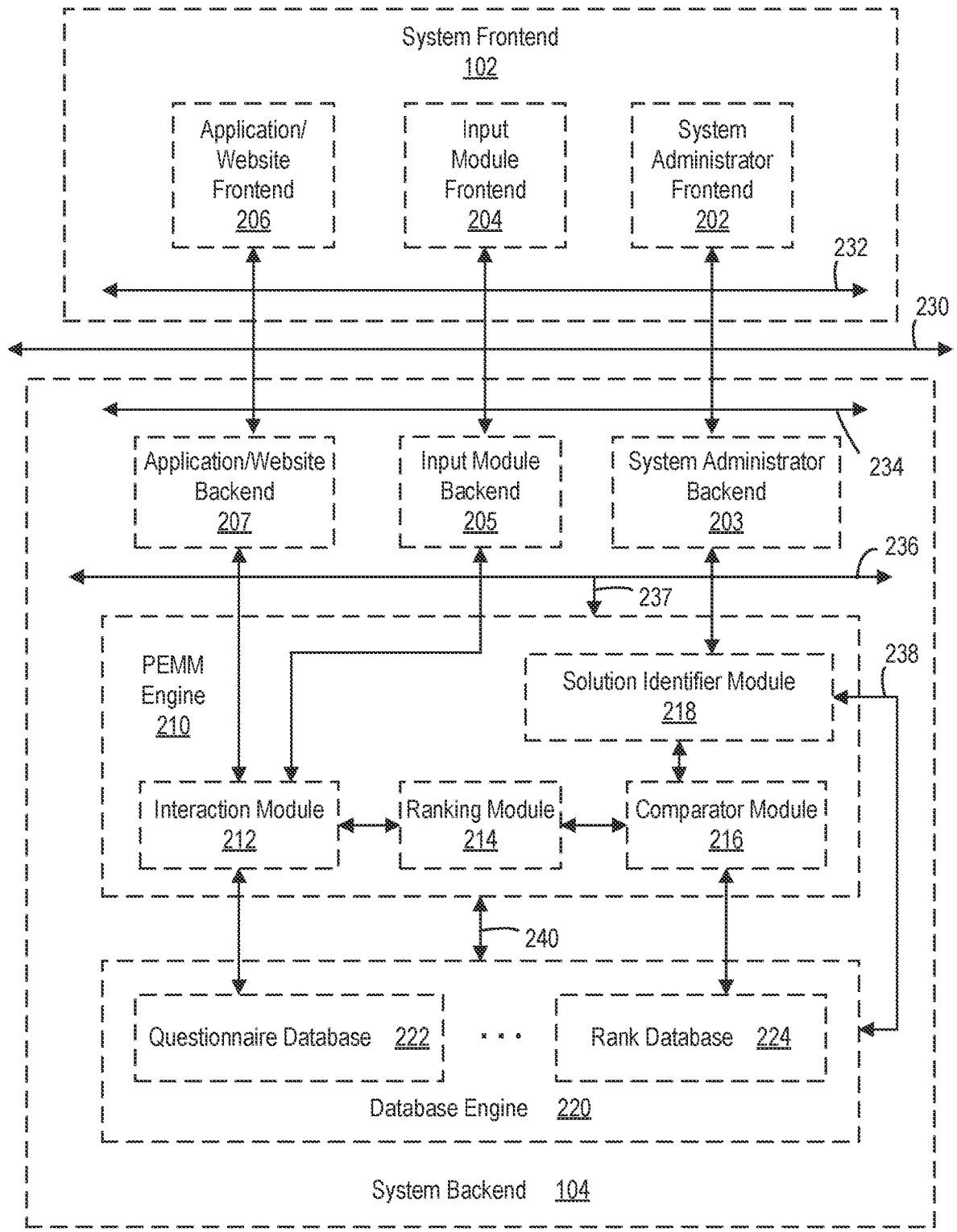
FIG. 2 illustrates an example architecture of the PEMM system, including the architecture of the system frontend and backend of the PEMM system, in accordance with some embodiments of the present disclosure.

FIG. 2 illustrates an example architecture 200 of the PEMM system, including the architecture of the system frontend 102 and the system backend 104 of the PEMM system, in accordance with some embodiments of the present disclosure. The system frontend 102 of the PEMM system is configured to host and execute frontend operations of the PEMM system. The system backend 104 of the PEMM system is configured to host and execute backend operations of the PEMM system. Each one of the system frontend 102 and the system backend 104 is a computer hardware module, a computer software module, or a combination thereof. Also, each one of the modules, sub-modules, engines, or other types of components described herein is a computer hardware module, a computer software module, or a combination thereof.

As shown in FIG. 2, the system frontend 102, according to architecture 200, includes a system administrator frontend component 202, an input module frontend component 204, and an application or website frontend component 206.

The system administrator frontend component 202 is configured to generate and provide a user interface and other frontend components of the system to an administrator of the system. The input module frontend component 204 is configured to generate and provide an additional user interface and other frontend components of the system to the administrator of the system and/or other types of users of the system. The application or website frontend component 206 is configured to generate and provide additional user interfaces for an application or a website of the system.

As shown in FIG. 2, the system backend 104, according to architecture 200, includes a system administrator backend component 203, an input module backend component 205, and an application or website backend component 207. The system administrator backend component 203 is configured to provide backend data processing that compliments features of the user interface and other frontend components of the system used by an administrator. The input module backend component 205 is configured to provide backend data processing that compliments features of the user interface and other frontend components of the system used by an administrator or another type of user of the system. The application or website backend component 207 is configured to provide backend data processing that compliments features of the websites and applications of the system.

Also, as shown in FIG. 2, the system backend 104, according to architecture 200, includes a PEMM engine 210.

The PEMM engine 210 includes an interaction module 212, and a ranking module 214, a comparator module 216, and a solution identifier module 218. The interaction module 212 is configured to access an application of the organization, identify meta-data associated with the organization, receive inputs of the system administrator from the input modules, share the inputs with the questionnaire module or database and share questions with the system administrator over input modules based on the responses received by the system administrator and the information gathered from the application. The ranking module 214 is configured to generate rankings for the organization based on the meta-data received from the application and the responses received by the interaction module for questions asked, which are accessed from the questionnaire database or modules. The comparator module 216 is configured to receive the meta-data and the rank of the organization from the ranking module and standard rank from the ranking database that is used by the organization to work at an enhanced performance level in a functional area of the organization to identify one or more zones where performance of the organization is to be enhanced. The comparator module can operate with a solution identifier module to generate a report to share with the system administrator over the input module. The report is based on the received meta-data of the organization and one or more details from the comparator that includes one or more zones where performance of the organization can be enhanced and thereby achieve a higher performance maturity level.

The solution identifier module 218 is configured to provide a unique way to calculate the gap between an organization's current state versus the corresponding industry benchmark. The gap is derived from various attributes gathered during the assessment. The benchmark and the knowledge base of the PEMM system can be dynamic in that it continually changes. The solution identifier module 218 is also configured to manage and organize changes in the benchmarks and the knowledge base. The solution identifier module 218 is also configured generate and provide assessments of the performance engineering maturity of an organization based on attributes created by itself or other modules or engines of the system. The attributes can be created by the solution identifier module 218 or other parts of the system during the assessment ran by the solution identifier module 218. The solution identifier module 218 is also configured to consider the knowledge base of the system or the organization in its assessment of the performance engineering maturity. The solution identifier module 218 is also configured to generate a remediation plan so that a customer can reach a target state or the industry benchmark. The generation of the remediation can be based on several types of inputs including inputs outputted from sub-modules and data processing engines of the solution identifier module and derivatives thereof (e.g., see outputs 323, 325, 327, and 329 shown in FIG. 3).

Also, as shown in FIG. 2, the system backend 104, according to architecture 200, includes a database engine 220. The database engine 220 can include or be a part of any type of database management system (DBMS). For example, the database engine 220 can include or be a part of a navigational DBMS, a relational DBMS, a SQL DBMS, an object-oriented DBMS, a NoSQL DBMS, or a NewSQL DBMS, or the like, or any combination thereof. The database engine 220 is configured to receive and/or retrieve and store outputs outputted from the solution identifier module 218 (e.g., see the outputs 323, 325, 327, and 329 shown in FIG. 3).

The database engine 220 includes a questionnaire database 222 and a rank database 224. The questionnaire database 222 is configured to store, organize, and provide questions for assessing performance engineering maturity and responses to the questions. The rank database 224 is configured to store, organize, and provide rank and rating information related to assessments of performance engineering maturity.

FIG. 2 also shows the busses of the architecture 200. Each one of the busses or other types of components described herein is a computer hardware module, a computer software module, or a combination thereof. Busses described herein can include several types of medium to communicate information from one component to another component, and the busses can include wireline busses and wireless busses. The busses of the architecture 200 include bus 230, bus 232, bus 234, bus 236, sub-bus 237, bus 238, and bus 240. For the purposes of this disclosure, it is to be understood that a sub-bus is an individual bus and a component of a bus. In other words, it is to be understood that a bus can be divided into sub-busses.

Bus 230 communicatively couples the system frontend components with the system backend components of the PEMM system. For example, bus 230 communicatively couples the system administrator frontend component 202, system administrator backend component 203, input module frontend component 204, input module backend component 205, application or website frontend component 206, and application or website backend component 207. Bus 230 includes bus 232 and bus 234. Bus 232 communicatively couples the system administrator frontend component 202, input module frontend component 204, and application or website frontend component 206. Bus 234 communicatively couples the system administrator backend component 203, input module backend component 205, and application or website backend component 207. Bus 232 can be hosted by one or more client devices (e.g., see client devices 112a, 112b, and 112c). Bus 234 can be hosted by one or more server devices (e.g., see server devices 114a, 114b, and 114c). Bus 230 can be hosted by LAN/WAN network(s) 116.

Bus 236 communicatively couples the system administrator backend component 203, input module backend component 205, and application or website backend component 207 with the PEMM engine 210 and the components of the PEMM engine (e.g., see interaction module 212, ranking module 214, comparator module 216, and solution identifier module 218). Sub-bus 237 communicatively couples system administrator backend component 203, input module backend component 205, and application or website backend component 207 and the PEMM engine.

Bus 238 communicatively couples the solution identifier module 218 and the database engine 220. Bus 240 communicatively couples the PEMM engine and the database engine 220. Not depicted, bus 238 can be a sub-bus of bus 240.

Figure 3:
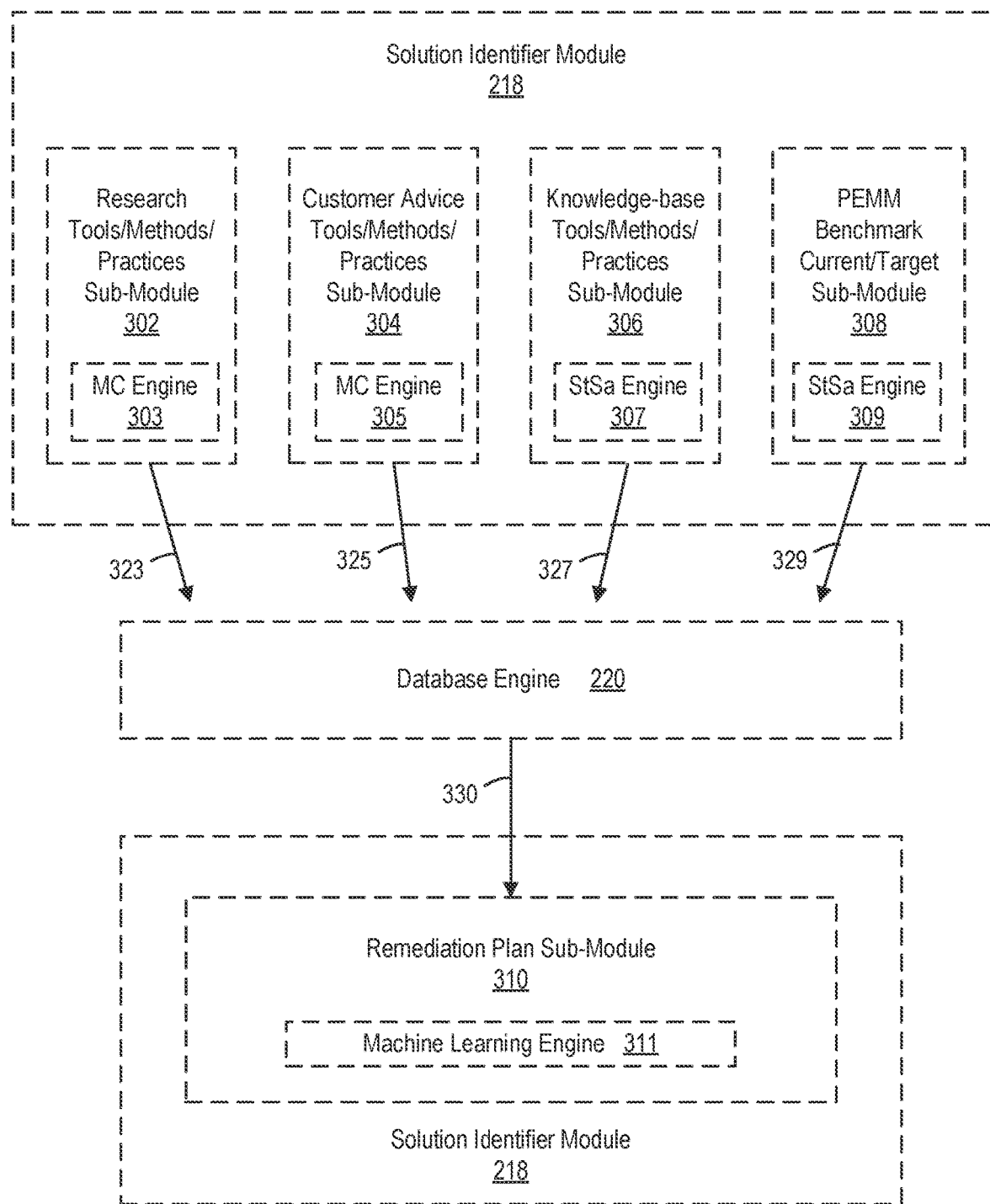
FIG. 3 illustrates aspects of an example solution identifier module of the architecture shown in FIG. 2, in accordance with some embodiments of the present disclosure.

FIG. 3 illustrates example aspects of the solution identifier module 218 of the architecture 200 of the PEMM system, in accordance with some embodiments of the present disclosure. Also, FIG. 3 shows a way the example aspects of the solution identifier module 218 interact with the database engine 220.

As shown in FIG. 3, the solution identifier module 218 includes sub-module 302, sub-module 304, sub-module 306, and sub-module 308.

Sub-module 302 is configured to generate enhanced and organized information on research technologies for use by the organization—including a research tools, research methods, and research practices related to the IT systems of the organization—using Monte Carlo (MC) data processing executed by an MC engine 303. The MC engine 303 is configured to retrieve or generate initial or current data on the research technologies to be used by the organization and use such information as a basis along with additional data to generate enhanced and organized research technology information for the organization. The research technology information including data on research tools, methods and practices related to IT systems that have not been used or recommended by the organization.

In some embodiments, the MC data processing includes a MC algorithm and confidence intervals. In such embodiments, instead of estimating an unknown parameter with a single value, the PEMM system uses a confidence interval. The confidence interval can represent a range and/or a likelihood that a value is a certain unknown value within a range. The confidence interval can also provide a confidence level of the unknown value residing within a range.

Sub-module 304 is configured to generate enhanced and organized information on tools, methods, and practices recommended by or already used by the organization—including a tools, methods, and practices related to the IT systems of the organization (such as research technologies recommend or already used by the organization)—using MC data processing executed by an MC engine 305. MC engine 305 is configured to retrieve or generate initial or current data on the technologies recommended by or used by the organization and use such information as a basis along with additional data to generate enhanced and organized technology information for the organization. The enhanced and organized technology information for the organization includes data on tools, methods and practices related to IT systems that have been used or recommended by the organization.

Sub-module 306 is configured to generate enhanced and organized information on a knowledgebase of the organization, including a knowledgebase of tools, methods, and practices related to the IT systems of the organization, using stratified sampling (StSa) executed by an StSa engine 307. StSa engine 307 is configured to retrieve or generate initial or current knowledgebases of the organization and use such information as a basis along with additional data to generate enhanced and organized knowledgebase information for the organization.

In some embodiments, the stratified sampling or StSa includes a group of PEMM data points. The data points can include answers and questions for the evaluation of PEMM of an organization. The samples of stratified sampling or StSa represent groups of samples that are proportional and by using such a technique the amount of processing for the sampling and generation of input for the machine learning can be reduced. Stratified sampling can be enhanced by using a smaller number of samples and reducing the size of sampling to a point where a corresponding standard error of the sampling is below a predetermined threshold.

Sub-module 308 is configured to generate information on a current PEMM benchmark and a target benchmark using StSa executed by an StSa engine 309. StSa engine 309 is configured to retrieve or generate initial or current PEMM benchmark information and use such information as a basis along with additional data to generate target PEMM benchmark information.

Database engine 220 is configured to store the outputs of 302, 304, 306, and 308, which are outputted by 303, 305, 307, and 308, respectively.

Also, as shown in FIG. 3, the solution identifier module 218 includes a remediation plan sub-module 310 that is configured to generate a remediation plan. The remediation plan sub-module 310 is configured to retrieve, from the database engine 220, the stored outputs of sub-modules 302, 304, 306, and 308 and use the stored outputs and machine learning to generate the remediation plan.

The remediation plan sub-module 310 is configured to use the outputs of sub-modules 302, 304, 306, and 308 as inputs for machine learning functions implemented by the machine learning engine 311 (e.g., see output 330 which can include outputs 323, 325, 327, 329, or a combination thereof). The machine learning engine 311 is a part of the remediation plan sub-module 310 and is configured to generate one or more outputs based on one or more machine learning functions and the inputs provided by the sub-modules 302, 304, 306, and 308. The output of the machine learning functions (or function in some embodiments) can include a PEMM rating that can include or be associated with one or more PEMM domains, PEMM practices, advice from a consultant or the organization, or research by a consultant or the organization. For some of the machine learning processes herein, labeling of the data inputted and outputted by the processes can be used. For example, stages of the evaluation can be labeled, practices, tools, and standards used by the organization can be labeled, and different aspect of the PEMM can be labeled (such as the PEMM rating, domains, practices, etc.

The machine learning functions of the machine learning engine 311 can include supervised learning, unsupervised learning, semi-supervised learning, reinforcement learning, dimensionality reduction, or a combination thereof. The machine learning functions of the machine learning engine 311 can also include deep learning as well as feature learning (such as through an artificial neural network (ANN), multilayer perceptrons, supervised dictionary learning, or a combination thereof). The machine learning functions of the machine learning engine 311 can also include deep learning and sparse dictionary learning, anomaly detection, robot learning, or a combination thereof. Robot learning includes a combination of supervised learning, reinforcement learning, and meta-learning. For example, in some embodiments, an ANN is used with the outputs of sub-modules 302, 304, 306, and 308 as inputs to the ANN or with a derivative of the outputs of sub-modules 302, 304, 306, and 308 as inputs to the ANN. The output of the ANN or a derivative of the output of the ANN can be one or more parts of a remediation plan outputted by the remediation plan sub-module 310.

In such embodiments including the solution identifier module 218 and other embodiments of the PEMM system, the solution identifier module 218 or another component of the system backend 104 is configured to evaluate the performance maturity of an organization. Other components of the PEMM system can also play a part in the evaluation of performance maturity. For example, the backend 104 can include a module to accommodate a system administrator to understand the performance maturity of the organization based on methods, processes and tools used by the organization (e.g., see the administrator backend component 203 or the admin backend 603 shown in FIG. 6). Also, the system frontend 102 can include corresponding components (e.g., see system administrator frontend component 202 and admin frontend 602 shown in FIG. 6). The system can also include an input module, which can be controlled by the system administrator, for providing information related to the organization used to evaluate the performance engineering maturity of the organization (e.g., see input module frontend component 204 and input module backend component 205 as well as the admin frontend 602 and the admin backend 603). Further, the system can include an interaction module that accesses an application of the organization and interacts with the system administrator over the input module to share a predefined set of questions and receive responses of the system administrator (e.g., see the interaction module 212 and the assessment engine 616 shown in FIG. 6).

Additionally, in such embodiments and other embodiments, the system can include a database that includes questionnaire database and a ranking database (e.g., see database engine 220. The questionnaire database can store all the pre-defined set of questions pertaining to various industries, functions and requirements that are asked to the client regarding the application to optimize performance of the application. And, the interaction module can access the application of the organization, identifies meta-data associated with the organization, receives inputs of the system administrator from the input module, shares the inputs with the questionnaire module and shares pre-defined questions with the system administrator over input module, such as dynamically, based on the responses received by the system administrator and the information gathered from the application. In such embodiments and other embodiments, the application of the organization, accessed to obtain the meta-data, can be at least one of web page, website, mobile application and the like of the organization. Or, the application can be any other information portal of the organization through which data pertaining to the performance engineering maturity evaluation can be carried out. Also, the questionnaire database and the ranking database can be accessed over Internet and can be present on a server, cloud network, and the like.

Additionally, in such embodiments and other embodiments, the system backend can include a database that includes a ranking module that generates rank for the performance engineering maturity of the organization based on the meta-data received from the application of the organization and the responses received by the system administrator over the interaction module for questions asked, which are accessed from the questionnaire database. Further, the system, in its backend, can include a comparator (e.g., see comparator module 216) that receives the meta-data and the rank of the organization from the ranking module and a standard rank from the ranking database that is used for the organization to work at an enhanced performance level in the functional area of the organization to identify zones where performance of the organization is determined to need enhancement. The ranking database stores standard pre-defined ranks for pre-determined functional areas, which indicates the enhanced rank for the organization to perform at an enhanced performance level.

Figure 6:
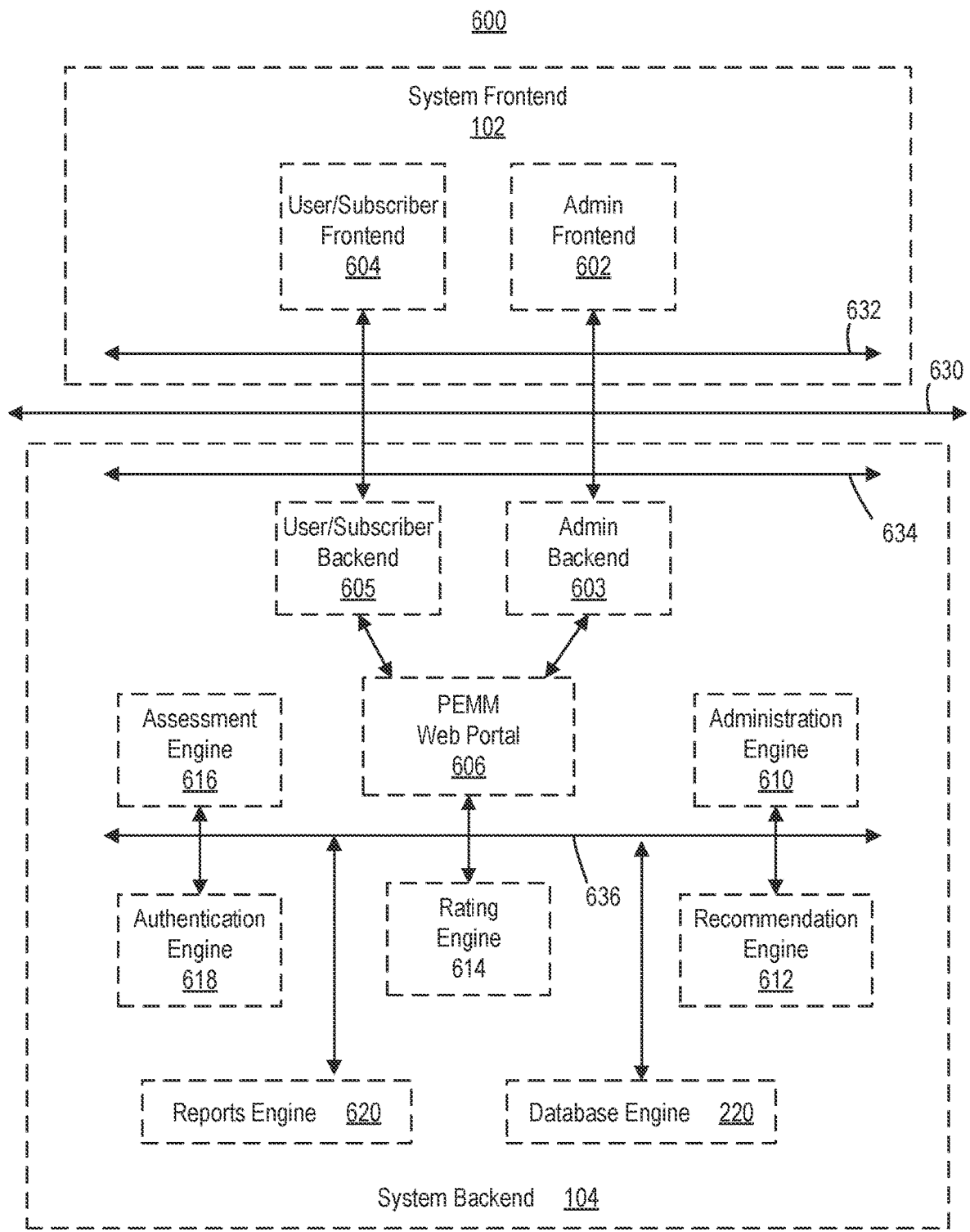
FIG. 6 illustrates a second example architecture of the PEMM system, including the architecture of the system frontend and backend of the PEMM system, in accordance with some embodiments of the present disclosure. The architectures shown in FIGS. 2 and 6 can be used together or separately in different implementations of the PEMM system.

Also, the system backend can include a solution identifier module (e.g., see solution identifier module 218 or the recommendation engine 612 and reports engine 620 shown in FIG. 6) that generates a report to share with the system administrator over the input module. The report is based on the received meta-data of the organization and details from the comparator that includes zones where performance of the organization is to be enhanced and thereby achieve a certain performance engineering maturity level.

Figure 4:
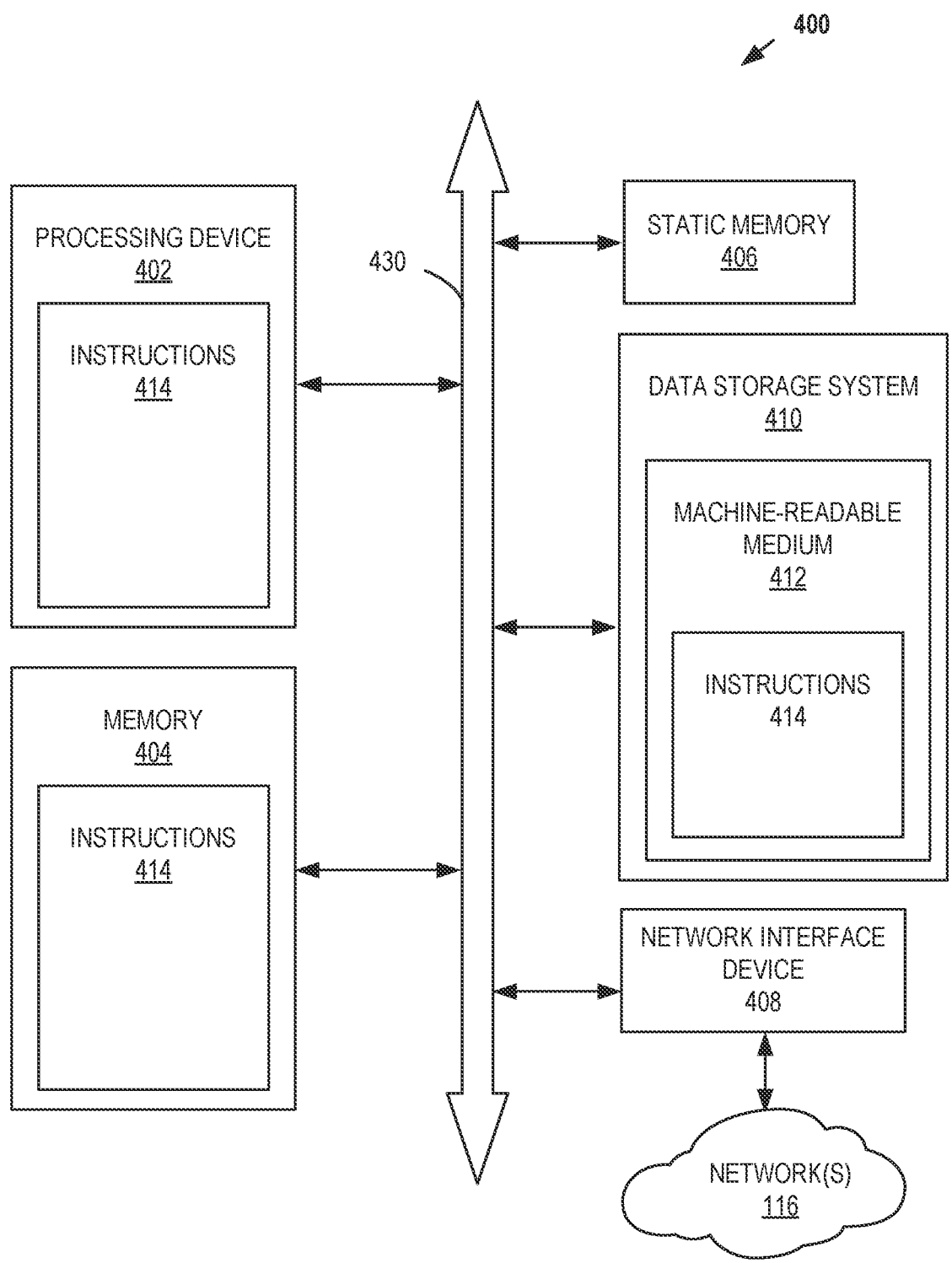
FIG. 4 illustrates is a block diagram of example aspects of an example computer system, in accordance with some embodiments of the present disclosure.

FIG. 4 illustrates is a block diagram of example aspects of an example computing system 400, in accordance with some embodiments of the present disclosure. FIG. 4 illustrates parts of the computing system 400 within which a set of instructions, for causing a machine of the computing system 400 to perform any one or more of the methodologies discussed herein, can be executed. In some embodiments, the computing system 400 can correspond to a host system that includes, is coupled to, or utilizes memory or can be used to perform the operations of a controller (e.g., to execute an operating system to perform operations corresponding to any one of the client or server devices shown in FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 400 includes a processing device 402, a main memory 404 (e.g., read-only memory (ROM), flash memory, dynamic random-access memory (DRAM), etc.), a static memory 406 (e.g., flash memory, static random-access memory (SRAM), etc.), and a data storage system 410, which communicate with each other via a bus 430.

The processing device 402 represents one or more general-purpose processing devices such as a microprocessor, a central processing unit, or the like. More particularly, the processing device can be a microprocessor or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 414 for performing the operations discussed herein. The computing system 400 can further include a network interface device 408 to communicate over the LAN/WAN network(s) 116 of FIG. 1.

The data storage system 410 can include a machine-readable storage medium 412 (also known as a computer-readable medium) on which is stored one or more sets of instructions 414 or software embodying any one or more of the methodologies or functions described herein. The instructions 414 can also reside, completely or at least partially, within the main memory 404 and/or within the processing device 402 during execution thereof by the computing system 400, the main memory 404 and the processing device 402 also constituting machine-readable storage media.

In one embodiment, the instructions 414 include instructions to implement functionality corresponding to the client devices and server devices shown in FIG. 1 (e.g., see system frontend 102 and system backend 104 shown in FIGS. 1, 2, and 6). While the machine-readable storage medium 412 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 5:
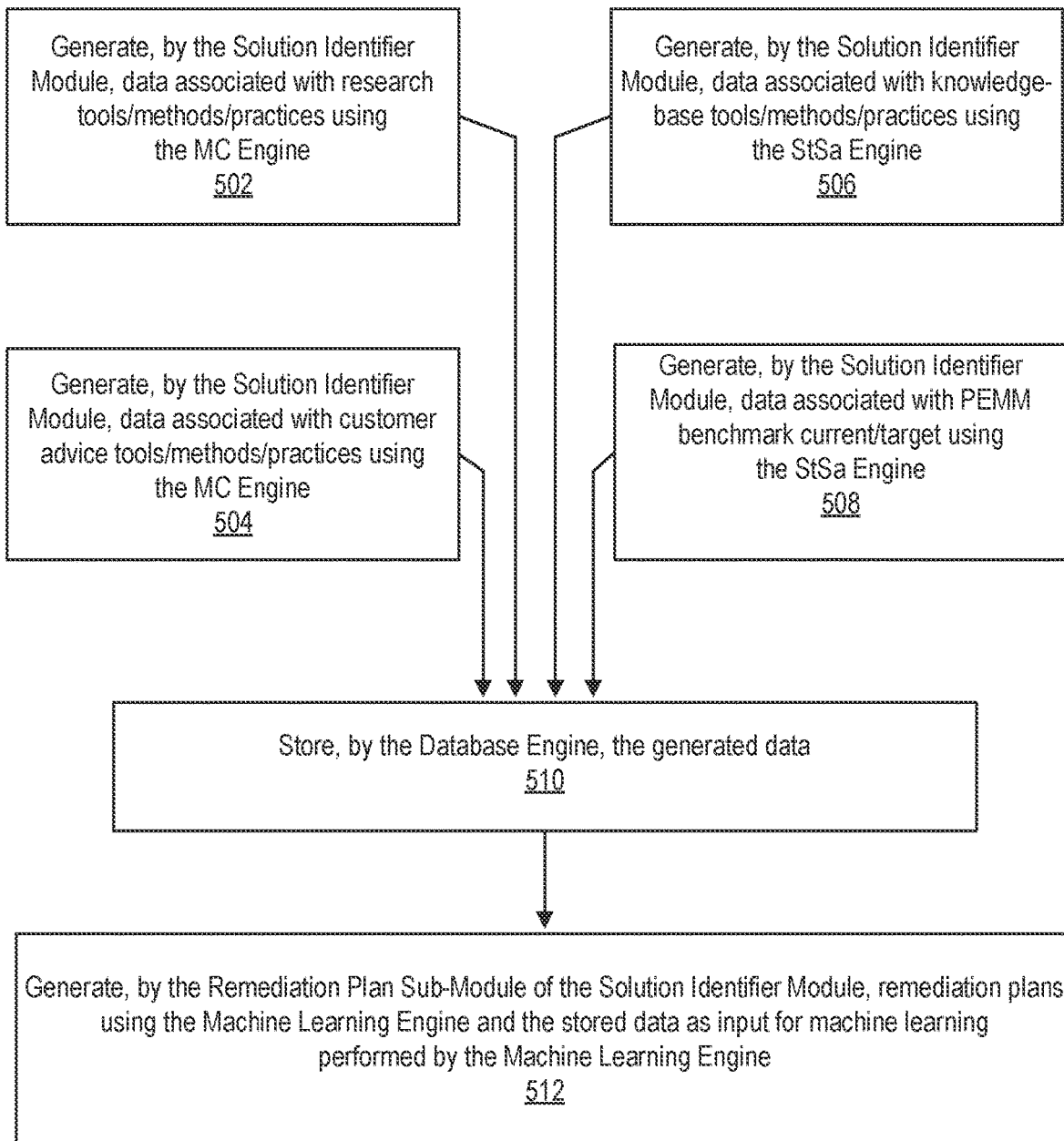
FIGS. 5 and 7 illustrate example operations of the PEMM system, in accordance with some embodiments of the present disclosure.

FIG. 5 illustrates example operations of method 500 of the PEMM system, in accordance with some embodiments of the present disclosure. The method 500 of the PEMM system commences with operations 502, 504, 506, and 508.

Operation 502 includes generating, by the solution identifier module 218, data associated with research tools, methods, and practices using the MC engine 303. As mentioned, the MC engine 303 is configured to retrieve or generate initial or current data on the research technologies to be used by the organization and use such information as a basis along with additional data to generate enhanced and organized research technology information for the organization. The research technology information including data on research tools, methods and practices related to IT systems that have not been used or recommended by the organization.

Operation 504 includes generating, by the solution identifier module 218, data associated with customer advice tools, methods, and practices using the MC engine 305. As mentioned, the MC engine 305 is configured to retrieve or generate initial or current data on the technologies recommended by or used by the organization and use such information as a basis along with additional data to generate enhanced and organized technology information for the organization. The enhanced and organized technology information for the organization includes data on tools, methods and practices related to IT systems that have been used or recommended by the organization.

Operation 506 includes generating, by the solution identifier module 218, data associated with knowledgebase tools, methods, and practices using the StSa engine 307. As mentioned, the StSa engine 307 is configured to retrieve or generate initial or current knowledgebases of the organization and use such information as a basis along with additional data to generate enhanced and organized knowledgebase information for the organization.

Operation 508 includes generating, by the solution identifier module 218, data associated with PEMM initial and target benchmarks using the StSa engine 309. As mentioned, the StSa engine 309 is configured to retrieve or generate initial or current PEMM benchmark information and use such information as a basis along with additional data to generate target PEMM benchmark information.

The method 500, at operation 510, includes storing, by the database engine 220, the data generated by the solution identifier module 218.

The method 500, at operation 512, includes generating, by the remediation plan sub-module 310 of the solution identifier module 218, remediation plans using the machine learning engine 311 and the stored data as input for machine learning performed by the machine learning engine.

FIG. 6 illustrates a second example architecture 600 of the PEMM system, including an alternative or additional architecture of the system frontend 102 and the backend 104 of the PEMM system, in accordance with some embodiments of the present disclosure. The architectures shown in FIGS. 2 and 6 can be used together or separately in different implementations of the PEMM system. Similarly, in architecture 600, the system frontend 102 of the PEMM system is configured to host and execute frontend operations of the PEMM system. And, the system backend 104 of the PEMM system is configured to host and execute backend operations of the PEMM system. Each one of the system frontend 102 and the system backend 104 is a computer hardware module, a computer software module, or a combination thereof. Also, each one of the modules, sub-modules, engines, or other types of components described herein is a computer hardware module, a computer software module, or a combination thereof.

As shown in FIG. 6, the system frontend 102, according to architecture 600, includes an admin frontend 602 and a user or subscriber frontend component 604. The admin frontend 602 is configured to is configured to generate and provide a user interface and other frontend components of the system to an administrator of the system. The user or subscriber frontend component 604 is configured to generate and provide a user interface and other frontend components of the system to a user or a subscriber (such as a subscriber group) of the system. As shown in FIG. 6, the system backend 104, according to architecture 600, includes an admin backend 603 and a user or subscriber backend component 605. The admin backend 603 is configured to provide backend data processing that compliments features of the user interface and other frontend components of the system used by the administrator of the system. The user or subscriber backend component 605 is configured to provide backend data processing that compliments features of the user interface and other frontend components of the system used by the user or the subscriber of the system.

Also, as shown in FIG. 6, the system backend 104, according to architecture 600, includes a PEMM web portal 606, an administration engine 610, a recommendation engine 612, a rating engine 614, an assessment engine 616, an authentication engine 618, a reports engine 620, and the database engine 220.

The PEMM web portal 606 is configured to provide an interface between the admin, user, and subscriber components of the system (e.g., see admin frontend 602, user or subscriber frontend component 604, admin backend 603, and user or subscriber backend component 605) and the engines of the system (e.g., see administration engine 610, recommendation engine 612, rating engine 614, assessment engine 616, authentication engine 618, a reports engine 620, and the database engine 220). This includes interfacing to the administration of the system, registration and purchase of PEMM packages of the system, login credentials, the assessment and evaluation features of the system, the rating and ranking features of the system, and the output recommendations of the system.

The administration engine 610 is configured to generate and provide the administrative features described herein and other such features of the PEMM system.

The recommendation engine 612 is configured to read benchmarking rules, identify gaps in performance engineering practices of the organization being evaluated, and recommend solutions to close the organization's gaps. The recommendation engine 612 can include or be a part of the solution identifier module 218 shown in FIGS. 2 and 3.

The rating engine 614 is configured to compare PEMM benchmarks to the PEMM of the organization to determine and show the gaps in the organization of its industry.

The assessment engine 616 is configured to control, generate and provide PEMM assessment questions and store the responses and results of such questions in a database of the database engine 220. The assessment engine 616 is also configured to update the PEMM system, such as via a database storage process, that an organization has conducted its assessment.

The authentication engine 618 is configured to check if user, subscriber, or administrator is registered with the system and check if such an entity is permitted to access certain parts of the system including certain data inputted into the system and outputted by the system. In other words, the authentication engine 618 is configured to provide authentication and authorization processes of the system.

The reports engine 620 is configured to generate and store reports of the system based on information outputted by the various engines and modules of the system. The reports engine can also include or correspond to a reports database that stores data of generated reports, recommendations provided in at least some of the reports, and related information and metadata. The generated reports for example can include information outputted by the recommendation engine 612, the rating engine 614, the assessment engine 616, the database engine 220, the solution identifier module 218, the comparator module 216, the ranking module 214, the interaction module 212, the questionnaire database 222, the rank database 224, or any combination thereof.

In addition to its features associated with the architecture 200, the database engine 220 is configured to store benchmarks and information inputted into and outputted from the PEMM system as well as intermediate information generated by the modules, engines and components of the system. Also, similar to the architecture 200, the database engine 220, in architecture 600, can include or be a part of any type of database management system (DBMS). For example, the database engine 220 can include or be a part of a navigational DBMS, a relational DBMS, a SQL DBMS, an object-oriented DBMS, a NoSQL DBMS, or a NewSQL DBMS, or the like, or any combination thereof.

FIG. 6 also shows the busses of the architecture 600. The busses of the architecture 600 include bus 630, bus 632, bus 634, and bus 636. Bus 630 communicatively couples the system frontend components with the system backend components of the PEMM system. For example, bus 630 communicatively couples the admin frontend 602, admin backend 603, user or subscriber frontend component 604, and user or subscriber backend component 605. Bus 630 includes bus 632 and bus 634. Bus 632 communicatively couples the admin frontend 602 and user or subscriber frontend component 604. Bus 634 communicatively couples the admin backend 603 and user or subscriber backend component 605. Bus 632 can be hosted by one or more client devices (e.g., see client devices 112a, 112b, and 112c). Bus 634 can be hosted by one or more server devices (e.g., see server devices 114a, 114b, and 114c). Bus 630 can be hosted by LAN/WAN network(s) 116.

Bus 636 communicatively couples PEMM web portal 606, administration engine 610, recommendation engine 612, rating engine 614, assessment engine 616, authentication engine 618, reports engine 620, and database engine 220.

Figure 7:
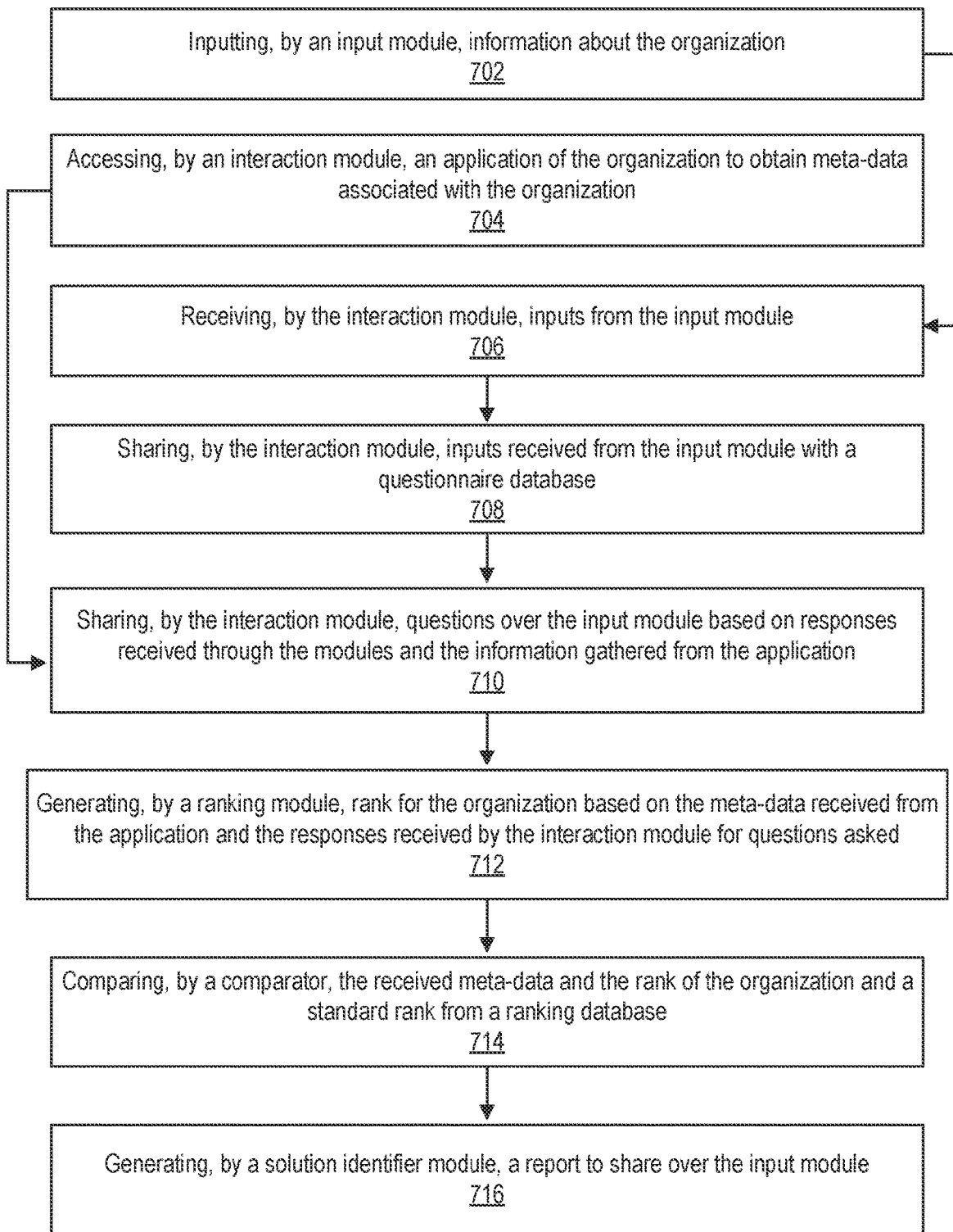

FIG. 7 illustrates example operations of method 700 of the PEMM system, in accordance with some embodiments of the present disclosure. The method 700 of the PEMM system commences with operations 702 and 704. Operation 702 includes inputting, by an input module, information about the organization. For example, inputting, by an input module handled by a system administrator, information about the organization. Operation 704 includes accessing, by an interaction module, an application of the organization to obtain meta-data associated with the organization. For example, accessing, by an interaction module, an application of the organization to obtain one or more meta-data associated with the organization.

The method 700 continues with the operation 706, which includes receiving, by the interaction module, inputs from the input module. For example, receiving, by the interaction module, one or more inputs from system administrator over the input module. Next, operation 708 includes sharing, by the interaction module, inputs received from the input module with a questionnaire database. For example, sharing, by the interaction module, inputs received by the system administrator over the input module with a questionnaire database. The questionnaire database is associated with a database stores plurality of pre-defined set of questions that are dynamically shared with the system administrator over input module. The database including of the questionnaire database and the ranking database can be accessed over internet and can be present on at least one of server and cloud network.

The method 700 continues with the operation 710, which includes sharing, by the interaction module, questions over the input module based on responses received through the modules and the information gathered from the application. For example, sharing, by the interaction module, questions with the system administrator over input module based on the responses received by the system administrator and the information gathered from the application. The application of the organization accessed to obtain the metadata can be at least one of a web page, a website, a mobile application and the like. Next, operation 712 includes generating, by a ranking module, rank for the organization based on the meta-data received from the application and the responses received by the interaction module for questions asked. For example, generating, by a ranking module, rank for the organization based on the meta-data received from the application and the responses received by the interaction module for questions asked, which are accessed from the questionnaire database. The metadata obtained by accessing the application can include any metadata related to the performance engineering maturity of the organization.

The method 700 continues with the operation 714, which includes comparing, by a comparator, the received meta-data and the rank of the organization and a standard rank from a ranking database. For example, comparing, by a comparator, the received meta-data and the rank of the organization from the ranking module and a standard rank from a ranking database associated with the database that is required for the organization to work at optimum performance level in the functional area of the organization to identify one or more key zones where performance of the organization needs to be optimized. The rank database stores standard pre-defined ranks for one or more pre-determined functional areas, which indicates the optimum rank required for the organization to perform at an optimum performance level.

Finally, the method 700, at operation 716, continues with generating, by a solution identifier module, a report to share over the input module. For example, generating, by a solution identifier module, a report to share with the system administrator over the input module, wherein the report is based on the received meta-data of the organization and one or more details from the comparator that includes one or more key zones where performance of the standards, methods and processes used by the organization needs to be optimized and thereby achieve desired performance maturity level.

In some embodiments, the operations of methods 500 and 700 can be implemented through a non-transitory computer-readable storage medium tangibly encoded with computer-executable instructions, that when executed by a processor of a computing device the processor performs the operations.

In general, some embodiments described herein provide a system for evaluating the performance engineering maturity of an organization based on standards, processes and tools used by the organization to build fast and reliable solutions and methods thereof. The system includes of an interaction module that interacts with a system administrator and gathers information about the standards, processes and tools used by the organization by dynamically asking a pre-defined set of questions, a ranking module that assigns a rank to the organization based on the gathered information, a comparator that compares the rank of the organization with an industry standard rank, and a solution identifier module that generates and provides a report based on the comparison between organization's rank and the industry standard rank. Further the system includes of a questionnaire database and a ranking database in a database that stores the pre-defined set of questions and standard ranks, respectively.

One of the many benefits of the PEMM system described herein includes its ability to evaluate performance engineering maturity as well as generate and provide recommendations when the inputs to the system are extremely varied and inconsistent.

Performance Engineering is often a lot of trial and error for many businesses because they spend too much time identifying a solid and practical methodology. In other cases, this vital concept is not on schedule, and their business applications' reliability is at risk. Usually, businesses start considering performance engineering activities when they are running in significant outages or slowdowns on their production environments. In such scenarios, there is not enough time to experiment and try different concepts. Therefore, a quick and consistent performance engineering approach is expected and could save these businesses from losing reputation or revenue loss. Such an approach, which can be adopted by the PEMM system described herein asks several critical questions. What performance engineering concepts are different industries implementing? What is the benchmark for performance engineering in different industries? How can we cut out the trial and error from performance engineering? Is there a systematic approach to ensure that business does not waste their time and money for trial & error in the performance engineering domain? How can we compare what different companies and industries are doing in the performance engineering domain? With such questions, the following factors need to be considered. Technology is changing all the time, so performance engineering approaches must be adapted in the future. Performance engineering standards can vary across industries.

In consideration of the complexity of the aforementioned inputs, the PEMM system described herein includes its ability to evaluate performance engineering maturity as well as generate and provide recommendations by rating and ranking of performance engineering practices, determining and evaluating industry performance engineering benchmarks, comparing such information, and identifying solutions accordingly (which can include a solution identifier generating a customized remediation plan). The PEMM system is configured to, in a unique way, determine where an organization exists in the performance engineering domain. The organization can answer vital questions focusing on the entire software development cycle in its IT systems. All answers are stored, and the rating engine of the PEMM system can compare such information to relevant best practices stored in the databases of the system. The result of the comparison is a unique performance engineering maturity level. Examples, of the questions asked in the comparisons include: what is your rating versus what is the industry doing, and what are the gaps in a customer's performance engineering approach along his software life cycle? Finally, the solution identifier module (e.g., see the solution identifier module 218) reads the rating of a particular customer from the database, compares it to our industry benchmark, processes our best practices and recommendations, and creates appropriate solutions.

A benefit of the PEMM level or rating generated by the system is that it can find out how different industries such as finance, e-commerce, and others are doing. For instance, the system can determine and store a performance engineering benchmark for each sector. The data collected is from real customers and their businesses and will become cumulative over time; and thus improve the evaluation processes of the PEMM system.

In some embodiments of the PEMM system or methods thereof, the system provides a simplified input and output that requires minimal data retrieval and processing. For instance, in one example embodiment, a self-assessment is provided with limited assessment questions (e.g., twenty-seven questions only). In some embodiments, the output of the system provides a PEMM level that represents where an organization stands in terms of performance engineering maturity compared to its peers and competitors in its industry. The output of the PEMM system can also include a remediation plan and advice on how to close the gaps between the performance engineering maturity of the organization and its peers and competitors. To fulfill simplified or more complex embodiments, in general, the system includes hardware or software modules, such as modules related to registration and payments, user and organization account creation and management, admin user creation and management, assessment user creation and management, generation and management of questions for assessments, efficient storage of inputs, outputs, and intermediate data of the system, generation and control of generation of performance maturity levels, generation and control of generation of remediation recommendations, creation of domain specific reports and more generic reporting across domains and industries, and formatting and controlling different features of the system to be accessible through a computer network (e.g., accessible through the Internet).

Such features and others of embodiments describe herein, allow organizations to evaluate their PEMM relative to other organizations, become more productive with respect to their IT systems, avoid or at least limit trial and error, and fast track improvements in gaps and blind spots in their performance engineering.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and functionality presented herein are not inherently related to any particular computer or other apparatus. Various general-purpose systems can be used with programs in accordance with the teachings herein, or it can prove convenient to construct a more specialized apparatus to perform the methods described herein. The structure for a variety of these systems will appear as set forth herein. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer network, comprising a performance engineering maturity model (PEMM) system, the PEMM system comprising:
 a system frontend component hosted by a client device of the computer network; and a system backend component hosted by a server device of the computer network, the PEMM system configured to enhance a PEMM of information technology (IT) systems of an organization by generating a remediation plan using machine learning that comprises deep learning and an artificial neural network (ANN), the system backend component comprising:
(i) a stratified sampling engine configured to generate a first input for the ANN by:
  executing enhanced stratified sampling that includes generating data associated with knowledgebase tools, methods, and practices that includes generating initial or current PEMM benchmark information, the enhanced stratified sampling comprising reducing a size of sampling to an amount where a corresponding standard error of the sampling is below a predetermined threshold in order to reduce processing in the generation of the first input, and
  using the initial or current PEMM benchmark information as a basis along with additional data to generate target PEMM benchmark information, the initial or current PEMM benchmark information comprising groups of data points that are proportional and that include answers and questions for an evaluation of PEMM of the organization, and the groups by being proportional reduce processing in the generation of the first input;
(ii) a Monte Carlo engine configured to generate a second input for the ANN by executing Monte Carlo data processing that includes generating IT-systems data associated with research tools, methods, and practices related to the IT systems of the organization;
(iii) a machine learning engine, configured to:
  receive the first and second inputs for the ANN; and
  send an output of the ANN or a derivative thereof, over the Internet, to the system frontend component, the remediation plan comprising the output, of the ANN or a derivative thereof;
and (iv) a database engine configured to provide an intermediate layer between the machine learning engine and the stratified sampling and Monte Carlo engines.

2. The computer network of claim 1, wherein the machine learning comprises supervised learning.

3. The computer network of claim 1, wherein the machine learning comprises unsupervised learning.

4. The computer network of claim 1, wherein the machine learning comprises semi-supervised learning.

5. The computer network of claim 1, wherein the machine learning comprises reinforcement learning.

6. The computer network of claim 1, wherein the machine learning comprises dimensionality reduction.

7. The computer network of claim 1, wherein the machine learning comprises feature learning.

8. The computer network of claim 7, wherein the feature learning comprises multilayer perceptrons, supervised dictionary learning, or a combination thereof.

9. A system, comprising:
a system frontend component of a performance engineering maturity model (PEMM) system hosted by a client device of a computer network; and
a system backend component of the PEMM system hosted by a server device of the computer network, the PEMM system configured to enhance a PEMM of information technology (IT) systems of an organization by generating a remediation plan using machine learning that comprises deep learning and an artificial neural network (ANN), the system backend component comprising:
(i) a stratified sampling engine configured to generate a first input for the ANN by:
  executing enhanced stratified sampling that includes generating data associated with knowledgebase tools, methods, and practices that includes generating initial or current PEMM benchmark information, the enhanced stratified sampling comprising reducing a size of sampling to an amount where a corresponding standard error of the sampling is below a predetermined threshold in order to reduce processing in the generation of the first input, and
  using the initial or current PEMM benchmark information as a basis along with additional data to generate target PEMM benchmark information, the initial or current PEMM benchmark information comprising groups of data points that are proportional and that include answers and questions for an evaluation of PEMM of the organization, and the groups by being proportional reduce processing in the generation of the first input;
(ii) a Monte Carlo engine configured to generate a second input for the ANN by executing Monte Carlo data processing that includes generating IT-systems data associated with research tools, methods, and practices related to the IT systems of the organization;
(iii) a machine learning engine, configured to:
  receive the first and second inputs for the ANN; and
  send an output of the ANN or a derivative thereof, over the Internet, to the system, frontend component, the remediation plan comprising the output of the ANN or the derivative thereof; and
(iv) a database engine configured to provide an intermediate layer between the machine learning engine and the stratified sampling and Monte Carlo engines.

10. The system of claim 9, wherein the machine learning comprises supervised learning.

11. The system of claim 9, wherein the machine learning comprises unsupervised learning.

12. The system of claim 9, wherein the machine learning comprises semi-supervised learning.

13. The system of claim 9, wherein the machine learning comprises reinforcement learning.

14. The system of claim 9, wherein the machine learning comprises dimensionality reduction.

15. A method, comprising:
a client device of a computer network hosting a system frontend component of a performance engineering maturity model (PEMM) system;
a server device of the network hosting a system backend component of the PEMM system, the PEMM system configured to enhance a PEMM of information technology (IT) systems of an organization by generating a remediation plan using machine learning that comprises deep learning and an artificial neural network (ANN),
a stratified sampling engine of the system backend component generating a first input for the ANN by:
  executing enhanced stratified sampling that includes generating data associated with knowledgebase tools, methods, and practices that includes generating initial or current PEMM benchmark information, the enhanced stratified sampling comprising reducing a size of sampling to an amount where a corresponding standard error of the sampling is below a predetermined threshold in order to reduce processing in the generation of the first input, and using the initial or current PEMM benchmark information as a basis along with additional data to generate target PEMM benchmark information, the initial or current PEMM benchmark information comprising groups of data points that are proportional and that include answers and questions for an evaluation of PEMM of the organization, and the groups by being proportional reduce processing in the generation of the first input;

a Monte Carlo engine of the system backend component generating a second input for the ANN by executing Monte Carlo data processing that includes generating IT-systems data associated with research tools, methods, and practices related to the IT systems of the organization;

a machine learning engine of the system backend component receiving the first and second inputs for the ANN;

the machine learning engine sending an output of the ANN or a derivative thereof, over the Internet, to the system frontend component, the remediation plan comprising the output of the ANN or the derivative thereof; and a database engine of the system backend component providing an intermediate layer between the machine learning engine and the stratified sampling and Monte Carlo engines.

16. The method of claim 15, wherein the machine learning comprises supervised learning.

17. The method of claim 15, wherein the machine learning comprises unsupervised learning.

18. The method of claim 15, wherein the machine learning comprises semi-supervised learning.

19. The method of claim 15, wherein the machine learning comprises reinforcement learning.

20. The method of claim 15, wherein the machine learning comprises dimensionality reduction.

* * * * *